United States Patent
Lin et al.

(10) Patent No.: US 10,640,064 B2
(45) Date of Patent: May 5, 2020

(54) POWER MANAGEMENT METHOD AND DEVICE

(71) Applicant: KWANG YANG MOTOR CO., LTD., Kaohsiung (TW)

(72) Inventors: Chen-Sheng Lin, Kaohsiung (TW); Yi-Yang Tsai, Kaohsiung (TW); Chi-Hui Hsu, Taipei (TW); Nai-Kun Yeh, Taipei (TW); Te-Chuan Liu, Taipei (TW); Li-Hui Chen, Taipei (TW); Ping-Chen Su, Taipei (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 349 days.

(21) Appl. No.: 15/726,914

(22) Filed: Oct. 6, 2017

(65) Prior Publication Data

US 2018/0105127 A1    Apr. 19, 2018

(30) Foreign Application Priority Data

Oct. 14, 2016 (TW) .............................. 105133151 A

(51) Int. Cl.
| | | |
|---|---|---|
| *B60R 16/033* | (2006.01) | |
| *B60Q 9/00* | (2006.01) | |
| *H04W 4/00* | (2018.01) | |
| *B60R 16/03* | (2006.01) | |
| *H04W 4/80* | (2018.01) | |

(52) U.S. Cl.
CPC .............. *B60R 16/033* (2013.01); *B60Q 9/00* (2013.01); *B60R 16/03* (2013.01); *H04W 4/80* (2018.02)

(58) Field of Classification Search
CPC ......... H04W 4/80; B60Q 9/00; B60R 16/033; B60R 16/03
See application file for complete search history.

(56) References Cited

U.S. PATENT DOCUMENTS

| | | | | |
|---|---|---|---|---|
| 6,144,865 A | * | 11/2000 | Pichard | H04B 1/1615 455/574 |
| 7,570,012 B2 | * | 8/2009 | Dasgupta | B60L 58/20 320/104 |
| 7,818,106 B1 | * | 10/2010 | Pilgrim | H02J 7/0032 701/101 |
| 2003/0222607 A1 | * | 12/2003 | Simizu | A01D 34/006 318/139 |
| 2009/0066157 A1 | * | 3/2009 | Tarng | H03B 5/04 307/31 |
| 2011/0112779 A1 | * | 5/2011 | Tse | G01R 19/2513 702/60 |

(Continued)

*Primary Examiner* — Mussa A Shaawat
(74) *Attorney, Agent, or Firm* — Brinks Gilson & Lione

(57) ABSTRACT

A power management method for a vehicle is provided, and includes: upon a power switch of the vehicle being switched from a conductive state to a non-conductive state, controlling an electrical system of the vehicle to temporarily supply a wireless communication module of the vehicle with electric power and activating a timer; determining whether an elapsed time has reached a predetermined duration according to the timer; when the determination is affirmative, controlling the electrical system to stop supplying electric power; and when the determination is negative, controlling the timer to stop timing upon the power switch being switched from the non-conductive state to the activated state.

8 Claims, 4 Drawing Sheets

(56) References Cited

U.S. PATENT DOCUMENTS

| | | | |
|---|---|---|---|
| 2013/0278225 A1* | 10/2013 | Dietze | H02J 7/045 320/137 |
| 2014/0244074 A1* | 8/2014 | Kowada | B60R 16/03 701/2 |
| 2016/0257208 A1* | 9/2016 | Chong | H02J 1/10 |
| 2016/0288744 A1* | 10/2016 | Rutherford | B60L 1/00 |
| 2018/0009325 A1* | 1/2018 | Jang | B60L 53/305 |
| 2018/0086213 A1* | 3/2018 | Jefferies | H01R 13/6683 |

* cited by examiner

POWER MANAGEMENT METHOD AND DEVICE

CROSS-REFERENCE TO RELATED APPLICATION

This application claims priority of Taiwanese Patent Application No. 105133151, filed on Oct. 14, 2016.

FIELD

The disclosure relates to power management method and device, particularly to power management method and device for a vehicle.

BACKGROUND

A conventional electrical system of a vehicle may include a wireless communication unit that is capable of wireless communication with a user's portable electronic device based on Bluetooth® protocol. Therefore, the user can access other electrical devices of the vehicle (e.g., an audio player, a speaker, etc.) via a wireless connection between the wireless communication unit and the portable electronic device, for example, for playing music files stored in the portable electronic device or for answering a phone call. However, when a main switch of the vehicle is switched to a non-conductive state, the electrical supply from a battery of the vehicle to the wireless communication unit is cut off, and accordingly, the wireless communication unit is unable to establish or maintain the wireless connection with the portable electronic device.

SUMMARY

Therefore, an object of the disclosure is to provide a power management method that can alleviate the drawback of the prior art.

According to the disclosure, a power management method for a vehicle is provided. The vehicle includes an electrical system, a processor electrically connected to the electrical system, and a wireless communication module electrically connected to the processor. The electrical system includes a power switch and a battery. The power management method is to be implemented by the processor, and includes:
  upon the power switch being switched from a conductive state to a non-conductive state, controlling the electrical system to temporarily supply the wireless communication module with electric power from the battery for establishing a wireless connection, and activating a timer to start timing;
  determining whether an elapsed time has reached a predetermined duration according to the timer;
  when it is determined that the elapsed time has reached the predetermined duration, controlling the electrical system to stop supplying electric power to the wireless communication module; and
  when it is determined that the elapsed time has not reached the predetermined duration, controlling the timer to stop timing and resetting the timer upon the power switch being switched from the non-conductive state to the conductive state.

Another object of the disclosure is to provide a power management device that can alleviate at least one of the drawbacks of the prior art.

According to the disclosure, a power management device for a vehicle includes an electrical system and a processor. The vehicle includes a wireless communication module.

The electrical system includes a power switch operable to switch between a conductive state and a non-conductive state, and a battery electrically connected to the power switch.

The processor is electrically connected to the electrical system, is configured to be electrically connected to the wireless communication module, and is programmed to:
  upon the power switch being switched from the conductive state to the non-conductive state, control the electrical system to temporarily supply the wireless communication module with electric power from the battery for establishing a wireless connection, and activate a timer to start timing,
  determine whether an elapsed time has reached a predetermined duration according to the timer,
  when it is determined that the elapsed time has reached the predetermined duration, control the electrical system to stop supplying electric power to the wireless communication module, and
  when it is determined that the elapsed time has not reached the predetermined duration, control the timer to stop timing and reset the timer upon the power switch being switched from the non-conductive state to the conductive state.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
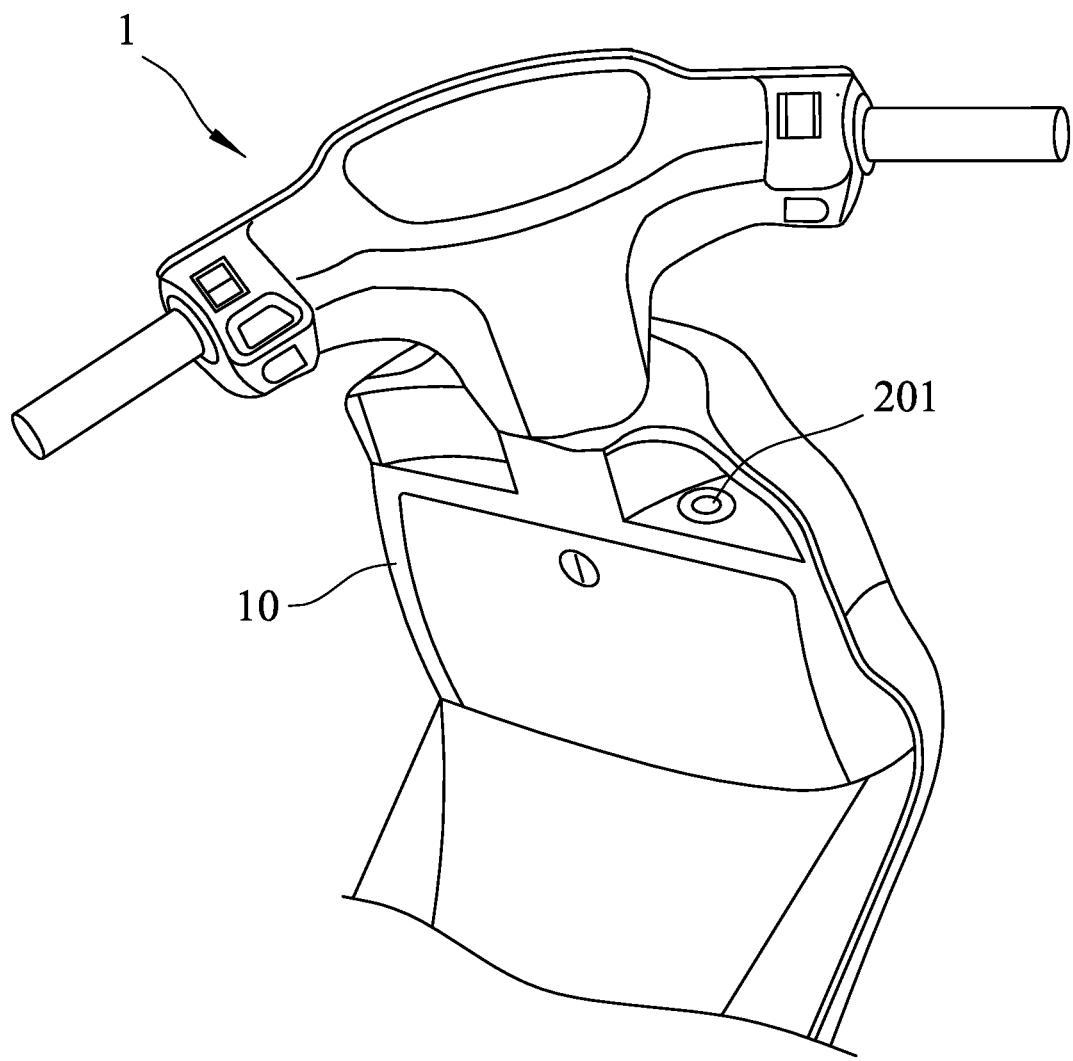
FIG. 1 is a fragmentary schematic perspective view of a vehicle that is provided with a power management device according to an embodiment of this disclosure.
Figure 2:
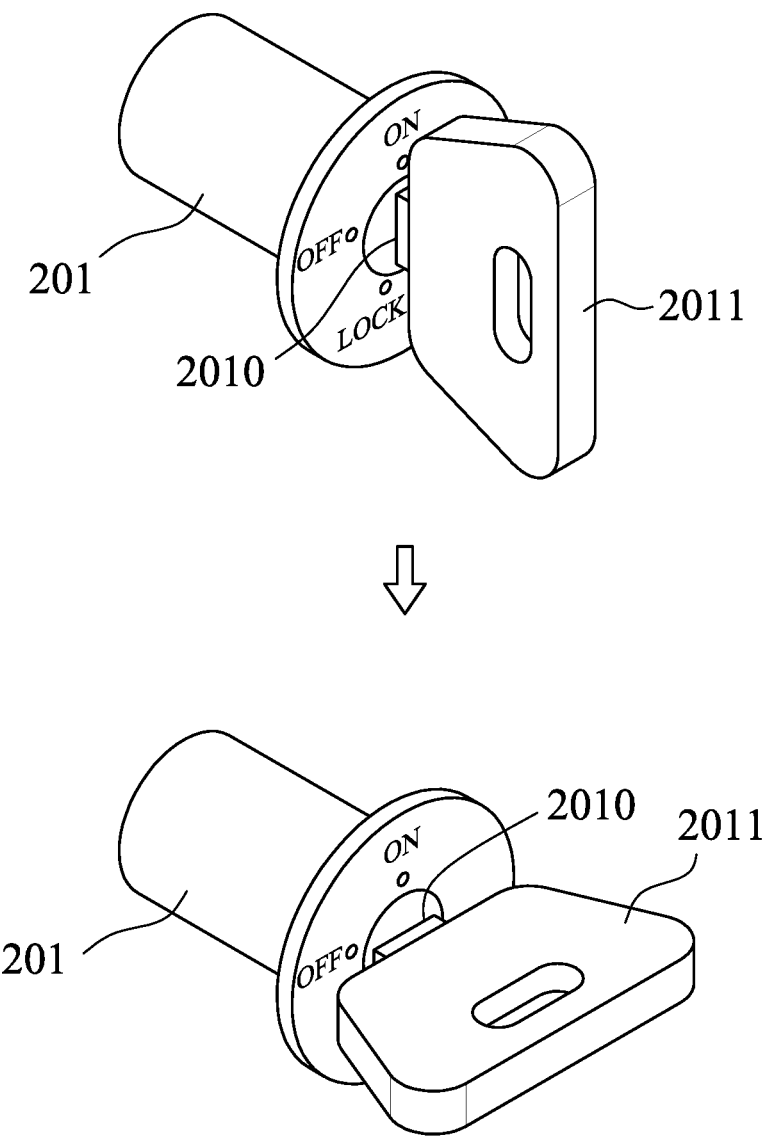
FIG. 2 is a perspective view illustrating a main switch of the vehicle being operated between a conductive state and a non-conductive state.
Figure 3:
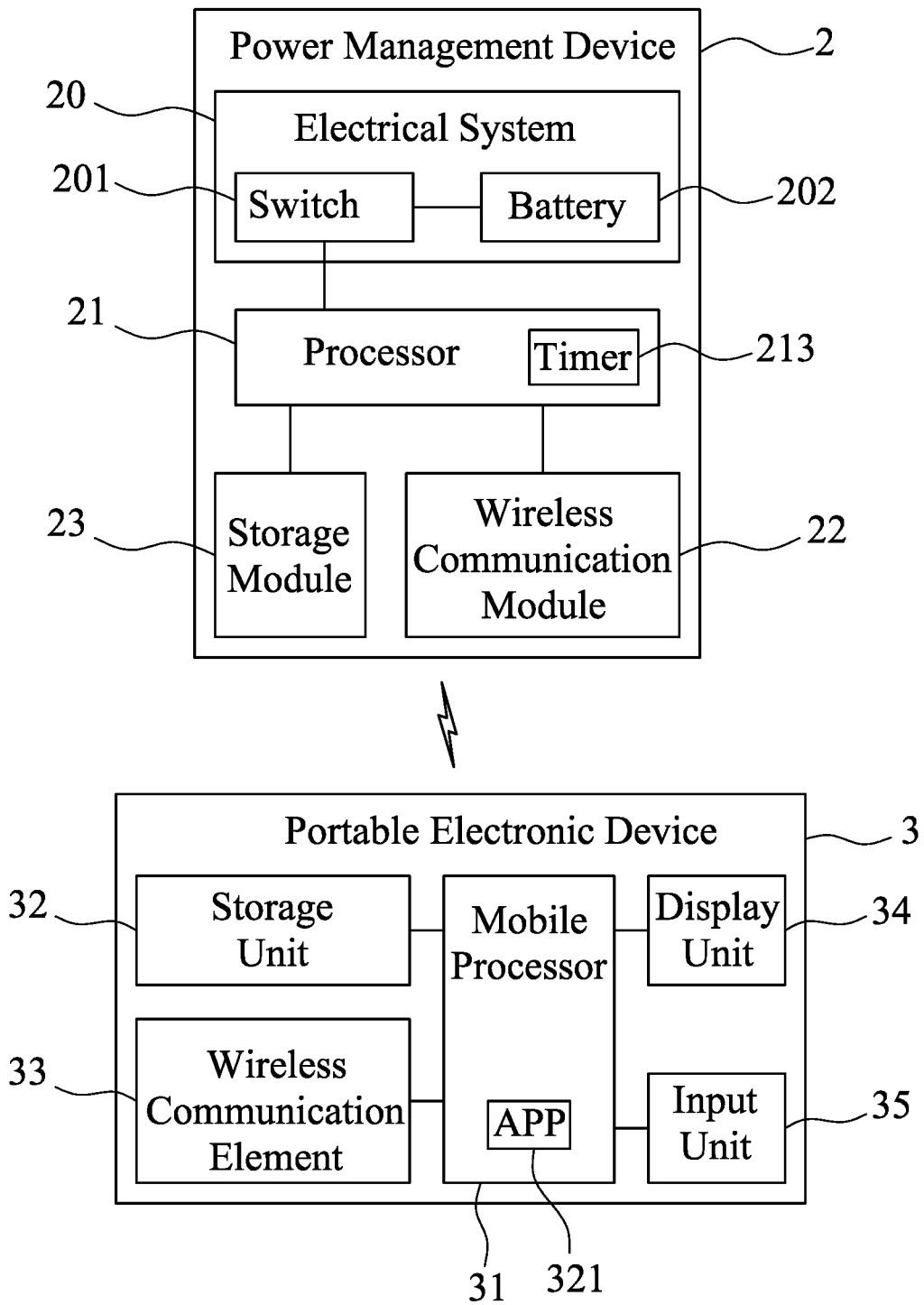
FIG. 3 is a block diagram of the power management device and a block diagram a portable electronic device communicating with the vehicle.

Referring to FIGS. 1, 2 and 3, a vehicle 1 is provided with a power management device 2 according to an embodiment of this disclosure. For example, the vehicle 1 may be a motorcycle, a scooter, a car, an all-terrain vehicle (ATV), a utility vehicle (UV), or any transportation equipment.

The vehicle 1 includes a vehicle body 10, and the power management device 2 is disposed in the vehicle body 10. The power management device 2 includes an electrical system 20, a processor 21, a wireless communication module 22 and a storage module 23.

The electrical system 20 includes a power switch 201 (i.e., a main switch of the vehicle 1), and a battery 202 electrically connected to the power switch 201. The power switch 201 has a key hole 2010 that is paired with a key 2011, and is operable to switch between a conductive state (see the upper part of FIG. 2) and a non-conductive state (see the lower part of FIG. 2). The user can insert the key 2011 into the key hole 2010, and turn the key 2011 clockwise to an "ON" position so that the power switch 201 is in the conductive state. To the contrary, the user can turn the key 2011 counterclockwise to an "OFF" position so that the power switch 201 is in the non-conductive state. In one embodiment, the power switch 201 may be a press button, or a keyless main switch paired with a smart key, but is not limited thereto. When the power switch 201 is in the conductive state, the battery 202 of the electrical system 20 supplies electric power to the vehicle 1. When the power switch 201 is in the non-conductive state, the battery 202 does not supply electric power to most components of the vehicle 1 (e.g., a stereo system and headlights that are not shown in the Figures), except at least the processor 21, at least for a period of time.

The processor 21 is electrically connected to the electrical system 20. The wireless communication module 22 is electrically connected to the processor 21, and is capable of establishing a wireless connection with a portable electronic device 3. The storage module 23 is electrically connected to the processor 21, and stores firmware causing the processor 21 to implement a power management method when executed by the processor 21. In the embodiment, the wireless communication module 22 is a Bluetooth® device, and the storage module 23 may be a read-only memory, a flash memory or a solid state drive.

The portable electronic device 3 may be a smart phone or a tablet, and includes a mobile processor 31, a storage unit 32, a wireless communication element 33, a display unit 34 and an input unit 35. The wireless communication element 33 is compatible with the wireless communication module 22 and is used to establish the wireless connection with the wireless communication module 22. In the embodiment, the wireless communication element 33 is a Bluetooth® device.

Figure 4:
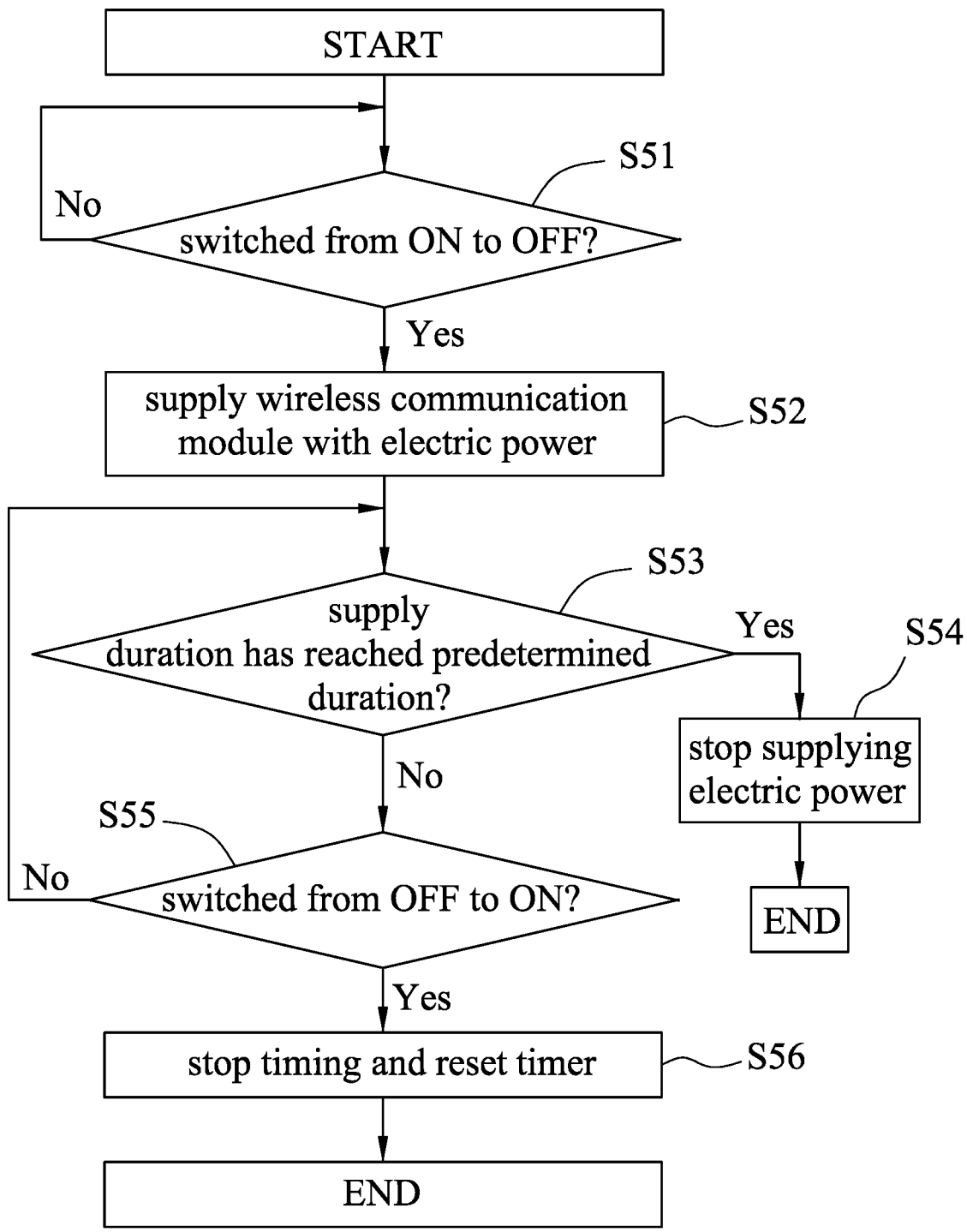
FIG. 4 is a flow chart illustrating steps of a power management method according to an embodiment of this disclosure.

Referring to FIG. 4, the power management method according to an embodiment of the disclosure is shown. The steps of the power management method and how the processor 21 implements the power management method will be described in the following paragraphs.

In step S51, the processor 21 determines whether the power switch 201 is switched from the conductive state to the non-conductive state. It should be noted that the determination made in step S51 may be implemented by known approaches. For example, the processor 21 may detect any change in an electric current between the electrical system 20 and an engine (not shown in the Figures) of the vehicle 1. When it is determined that the power switch 201 is not switched from the conductive state to the non-conductive state, step S51 is repeated. Otherwise, the flow will proceed to step S52.

Upon the power switch 201 being switched from the conductive state to the non-conductive state, in step S52, the processor 21 controls the electrical system 20 to temporarily supply the wireless communication module 22 with electric power from the battery 202, so that the wireless communication module 22 is in a standby state and is capable of establishing or maintaining the wireless connection with the portable electronic device 3. Specifically, when the power switch 201 is switched to the non-conductive state, the battery 202 of the electrical system 20 does not supply electric power to most components of the vehicle 1 (e.g., a stereo system and headlights that are not shown in the Figures), except the processor 21, which implements the power management method to selectively control supply of electric power to the wireless communication module 22, as will become apparent after the method has been fully described. As a result of the processor 21 controlling the supply of electric power to the wireless communication module 22, even when the user parks the vehicle 1 and switches the power switch 201 to the non-conductive state, for at least a period of time, the user can still operate the portable electronic device 3 to establish the wireless connection with the wireless communication module 22. For example, when the power switch 201 is in the non-conductive state, the wireless communication module 22 may continuously detect a wireless signal transmitted by the portable electronic device 3 that is paired with the wireless communication module 22 in advance. Upon detecting the wireless signal transmitted by the portable electronic device 3 (i.e., the portable electronic device 3 is nearby the vehicle 1), the processor 21 may control, for example, turn-signal lights (not shown in the Figures) to emit a flashing light as an indication of a position of the vehicle 1 for the approaching user.

Moreover, upon the power switch 201 being switched to the non-conductive state, the processor 21 further activates a timer 213 to start timing and controls the wireless communication module 22 to transmit a key-off signal to the portable electronic device 3. Upon receiving the key-off signal, the portable electronic device 3 displays on the display unit 34 a timing interface showing a timing result of the timer 213 according to the key-off signal. In this embodiment, the processor 21 activates the timer 213 to count down a predetermined duration, and the timing interface indicates countdown of the predetermined duration. The predetermined duration is a duration for which the wireless communication module 22 is to remain in the standby state. The user of the portable electronic device 3 can know the remaining time the wireless communication module 22 will be in the standby state from the timing interface shown on the display unit 34. For example, the predetermined duration is forty-eight hours and can be modified by the user using an application software (APP) 321 stored in the storage unit 32 (e.g., a solid-state drive) of the portable electronic device 3 when the wireless connection is established. Also, in the case that the portable electronic device 3 is implemented as a smart phone or a tablet, the display unit 34 and the input unit 35 may be integrated as a touch screen, and the user can modify the predetermined duration by operating the application software 321 on the touch screen.

In step S53, the processor 21 determines whether the timer 213 has counted down to zero. In other words, essentially, the processor 21 determines whether a period of electric power supply to the wireless communication module 22 after the power switch 201 is switched to the non-conductive state (i.e., an elapsed time after the timer 213 starts timing, also referred to as a supply duration) has reached the predetermined duration according to the timer 213. The flow goes to step S54 when it is determined that the timer 213 has counted down to zero (i.e., that the supply duration has reached the predetermined duration), and goes to step S55 when otherwise.

In step S54, the processor 21 controls the electrical system 20 to stop supplying electric power to the wireless communication module 22. The processor 21 may subsequently shut down supply of electric power from the battery 202 thereto. Accordingly, after step S54, the battery 202 outputs no electric power until the power switch 201 is switched to the conductive state, and the method is terminated.

In step S55, the processor 21 further determines whether the power switch 201 is switched from the non-conductive state to the conductive state. When it is determined that the power switch 201 is not switched from the non-conductive state to the conductive state, the flow will go back to step S53 and the wireless communication module 22 remains in the standby state; the flow will proceed to step S56 when otherwise.

In step S56, the processor 21 controls the timer 213 to stop timing the predetermined duration and resets the timer 213, and then, the method is terminated. It should be noted that, since the power switch 201 is switched from the non-conductive state to the conductive state as determined in step S55, the vehicle 1 is activated now, and the processor 21 will implement the power management method again by starting step S51.

In summary, the power management device 2 allows the wireless communication module 22 to keep working for the predetermined duration upon the vehicle 1 being inactivated (i.e., the power switch 201 being switched from the conductive state to the non-conductive state). During the predetermined duration, the wireless communication module 22 can not only establish the wireless connection with the portable electronic device 3, but also perform specific functions (e.g., controlling the turn-signal lights to emit the flashing light as an indication upon detecting the wireless signal from the portable electronic device 3). After the predetermined duration has elapsed, the electrical power supply from the battery 202 to the wireless communication module 22 will be cut off, so that the battery 202 is prevented from depletion. By this way, in comparison with a design to always supply electric power from the battery 202 to the wireless communication module 22 when the power switch 201 is in the non-conductive state, the wireless communication module 22 can still function for the predetermined duration after the engine of the vehicle 1 is turned off and the battery 202 will not be depleted even if the engine is turned off for a long time. For example, when the user is going to take an airplane to go abroad for a week and parks the vehicle 1 at a parking lot of an airport, the wireless communication module 22 keeps working for, and only for, the predetermined duration (e.g., 48 hours) after the power switch 201 is turned to the non-conductive state, and then the battery 202 stops supplying electric power after the predetermined duration has elapsed. Therefore, when the user comes back to the parking lot and switches the power switch 201 to the conductive state, the battery 202 will still have enough electrical power to turn on the engine and to activate the vehicle 1.

Furthermore, the wireless communication module 22 can transmit the key-off signal to make the portable electronic device 3 display the timing interface on the display unit 34 to show the remaining time before the predetermined duration ends. Accordingly, the user can know whether the wireless communication module 22 is still functional with the portable electronic device 3.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A power management method for a vehicle, the vehicle including an electrical system, a processor electrically connected to the electrical system, and a wireless communication module electrically connected to the processor, the electrical system including a power switch and a battery, the power management method to be implemented by the processor and comprising:
   upon the power switch being switched from a conductive state to a non-conductive state, controlling the electrical system to temporarily supply the wireless communication module with electric power from the battery in order to enable the wireless communication module to establish a wireless connection with a portable electronic device that includes a display unit, and activating a timer to start timing;
   controlling the wireless communication module to transmit a key-off signal to the portable electronic device so that the display unit displays a timing interface showing a timing result of the timer according to the key-off signal, the timing interface indicating countdown of a predetermined duration;
   determining whether an elapsed time has reached the predetermined duration according to the timer;
   when it is determined that the elapsed time has reached the predetermined duration, controlling the electrical system to stop supplying electric power to the wireless communication module; and
   when it is determined that the elapsed time has not reached the predetermined duration, controlling the timer to stop timing and resetting the timer upon the power switch being switched from the non-conductive state to the conductive state.

2. The power management method as claimed in claim 1, wherein the wireless communication module is a Bluetooth® device.

3. The power management method as claimed in claim 1, wherein activating the timer to start timing is to count down the predetermined duration.

4. The power management method as claimed in claim 1, wherein the power switch is a main switch of the vehicle.

5. A power management device for a vehicle that includes a wireless communication module, said power management device comprising:
   an electrical system that includes a power switch operable to switch between a conductive state and a non-conductive state, and a battery electrically connected to said power switch; and
   a processor that is electrically connected to said electrical system, that is configured to be electrically connected to the wireless communication module, and that is programmed to:
   upon said power switch being switched from the conductive state to the non-conductive state, control said electrical system to temporarily supply the wireless communication module with electric power from said battery in order to enable the wireless communication module to establish a wireless connection with a portable electronic device that includes a display unit, and activate a timer to start timing, control the wireless communication module to transmit a key-off signal to the portable electronic device so that the display unit displays a timing interface showing a timing result of said timer according to the key-off signal, the timing interface indicating countdown of a predetermined duration, determine whether an elapsed time has reached the predetermined duration according to the timer, when it is determined that the elapsed time has reached the predetermined duration, control said electrical system to stop supplying electric power to the wireless communication module, and when it is determined that the elapsed time has not reached the predetermined duration, control the timer to stop timing and reset the timer upon said power switch being switched from the non-conductive state to the conductive state.

6. The power management device as claimed in claim 5, further comprising the wireless communication module that is a Bluetooth® device.

7. The power management device as claimed in claim 5, wherein said processor is programmed to activate the timer to count down the predetermined duration.

8. The power management device as claimed in claim 5, wherein said power switch is a main switch of the vehicle.

* * * * *